United States Patent
Rapaport et al.

(10) Patent No.: US 6,773,841 B2
(45) Date of Patent: Aug. 10, 2004

(54) FUEL CELL HAVING INSULATED COOLANT MANIFOLD

(75) Inventors: Pinkhas A Rapaport, Penfield, NY (US); John P. Healy, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 232 days.

(21) Appl. No.: 10/132,058

(22) Filed: Apr. 25, 2002

(65) Prior Publication Data

US 2003/0203261 A1 Oct. 30, 2003

(51) Int. Cl.[7] .................... H01M 8/10; H01M 8/24; H01M 8/02
(52) U.S. Cl. .................... 429/26; 429/34; 429/38; 429/32; 429/210
(58) Field of Search ................ 429/26, 34, 38, 429/32, 18, 210

(56) References Cited

U.S. PATENT DOCUMENTS

| | | | |
|---|---|---|---|
| 4,371,433 A | 2/1983 | Balko et al. | 204/228 |
| 5,272,017 A | 12/1993 | Swathirajan et al. | 429/33 |
| 6,039,852 A | 3/2000 | Federico | 204/255 |
| 6,255,012 B1 * | 7/2001 | Wilson et al. | 429/38 |
| 6,372,376 B1 * | 4/2002 | Fronk et al. | 429/41 |

* cited by examiner

*Primary Examiner*—Patrick Ryan
*Assistant Examiner*—Angela J. Martin
(74) *Attorney, Agent, or Firm*—Cary W. Brooks

(57) ABSTRACT

Fuel cell stack having a plurality of liquid-cooled, bipolar plates separating one cell from the next. Coolant inlet and outlet manifolds are defined, in part, by surfaces of the bipolar plates, and respectively supply coolant to, and remove coolant from, the bipolar plates. The surfaces of the bipolar plates that define the coolant manifolds and confront the coolant in the manifolds are coated with a non-conductive coating to reduce shunt current flow through the coolant.

5 Claims, 3 Drawing Sheets

FUEL CELL HAVING INSULATED COOLANT MANIFOLD

TECHNICAL FIELD

This invention relates to fuel cells, and more particularly to liquid-cooled fuel cells having electrically insulated coolant manifold(s) to reduce shunt currents in the coolant.

BACKGROUND OF THE INVENTION

Fuel cells have been proposed as a power source for a variety of applications. Some fuel cells (e.g. PEM-type or phosphoric-acid-type) use hydrogen supplied to the anode as fuel, and oxygen (as air) supplied to the cathode as oxidant. PEM (i.e. Proton Exchange Membrane) fuel cells are preferred for vehicular applications owing to their compactness, moderate temperature operation, and high power density. PEM fuel cell stacks comprise a plurality of individual cells each of which has a so-called "membrane-electrode-assembly" comprising a thin, proton-transmissive, solid polymer, membrane-electrolyte (e.g. perfluronated sulfonic acid) having an anode on one face of the membrane-electrolyte and a cathode on the opposite face of the membrane-electrolyte. The number of cells in any given stack is determined by the desired output voltage of the stack. The anode and cathode typically comprise finely divided carbon particles, very finely divided catalytic particles supported on the carbon particles, and proton conductive material intermingled with the catalytic and carbon particles. The membrane-electrode-assembly is sandwiched between a pair of electrically conductive contact elements which serve as current collectors for the anode and cathode, and contain flow channels on their faces for distributing the fuel cell's gaseous reactants (i.e., $H_2$ & $O_2$/air) over the surfaces of the respective anode and cathode. One such membrane-electrode-assembly and fuel cell is described in U.S. Pat. No. 5,272,017 issued Dec. 21, 1993 to Swathirajan et al. and assigned to the assignee of the present invention.

Bipolar PEM fuel cell stacks comprise a plurality of the membrane-electrode-assemblies stacked together (typically in electrical series), and separated one from the next by a gas-impermeable, electrically-conductive bipolar plate. Each bipolar plate has an active region having a first face confronting the anode of one cell, a second face confronting the cathode of the next adjacent cell in the stack, and an internal cooling passage for circulating a coolant (e.g. ethylene glycol & water) through the plate behind the faces. Monopolar end plates are provided at the ends of the stack. An inactive region borders the active region of the bipolar plate, and has one or more openings therein. When the plates are stacked together, like openings in adjacent plates are aligned, and together with other stack components (e.g. gaskets), they form inlet and outlet manifolds that respectively supply and remove the gaseous reactants and coolant to/from the several bipolar plates. When so aligned a surface of each of the bipolar plates that defines the coolant opening forms part of the wall that defines the coolant manifold. This surface is electrically conductive, and during operation of the fuel cell contacts the coolant. This contact causes unwanted, parasitic shunt currents to flow through the coolant, and consequent reduced stack efficiency and possible electrolytic degradation of the coolant.

SUMMARY OF THE INVENTION

The present invention reduces the shunt currents that flow through the coolant in a fuel cell stack by electrically insulating the walls of the manifolds that supply and remove coolant from the stack. A fuel cell stack is provided that comprises a plurality of cells each of which has an anode exposed to a first reactant, a cathode exposed to a second reactant and an electrolyte interjacent the anode and cathode. The stack includes at least one (typically many) electrically conductive, bipolar plate that separates adjacent cells from each other. The bipolar plate comprises an electrically-conductive active region that has a first face confronting the anode of one cell, a second face confronting the cathode of the next adjacent cell in said stack, and an internal cooling passage for circulating a coolant through the plate behind the faces. The active region is bordered by at least one inactive region that houses manifolds for conducting the coolant and the reactants to/from the stack. In this regard, the inactive region of each bipolar plate has a surface that defines an opening through the inactive region, and that, in part, defines a manifold that supplies or removes coolant respectively to or from the coolant passage within the bipolar plate. In accordance with the present invention, at least the opening-defining surface of the inactive region is coated with an adherent, non-conductive coating that reduces the flow of shunt currents through the coolant in the manifold. Preferably, the entire inactive area of the bipolar plate is coated with the non-conductive coating for additional protection and ease of coating. The non-conductive coating preferably comprises a polymer, or, most preferably, an oxide of the metal used to make the bipolar plate, and may be applied by spraying, brushing, dipping, electrolytically, CVDing or PVDing. When the bipolar electrode is made from a metal such as titanium, the non-conductive coating will preferably comprise an oxide (i.e. titanium oxide) of that metal formed in situ (e.g, by anodization). The invention is particularly advantageous to PEM fuel cells that have proton-transmissive membrane electrolytes, rather than a flowing liquid electrolyte through which shunt currents can flow.

BRIEF DESCRIPTION OF THE DRAWINGS

The invention will better be understood when considered in the light of the following detailed description of certain embodiments thereof which is given hereafter in conjunction with the several figures in which.

DESCRIPTION OF SPECIFIC EMBODIMENTS

Figure 1:
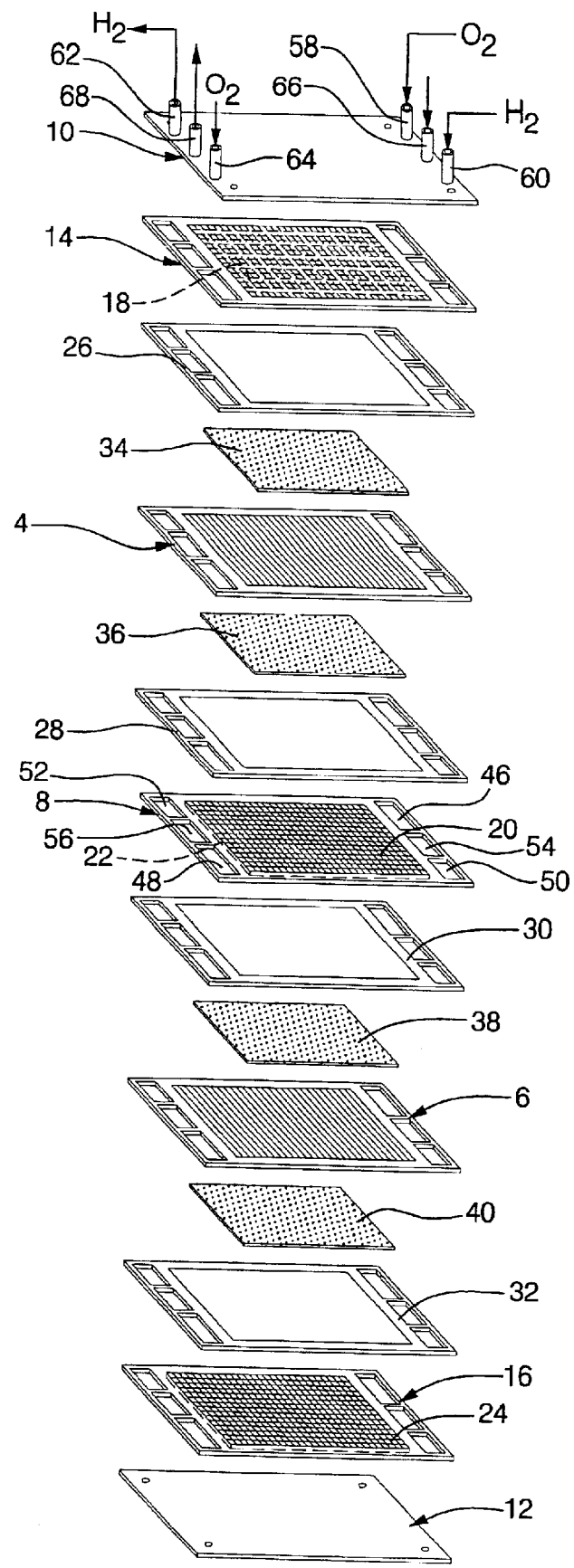
FIG. 1 is a schematic, exploded, isometric, illustration of a liquid-cooled, PEM fuel cell stack (only two cells shown)

For simplicity, only a two-cell stack (i.e. one bipolar plate) is illustrated and described hereafter, it being understood that a typical stack will have many more such cells and bipolar plates. FIG. 1 depicts a two-cell, bipolar PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end plates 14 and 16. The clamping plates 10, 12 are electrically insulated from the end plates 14, 16 by a gasket or dielectric coating (see FIG. 3). The monopolar end plates 14 and 16, as well as both working faces of the bipolar plate 8, contain a plurality of grooves or channels 18, 20, 22, and 24 defining a so-called "flow field" for distributing fuel and oxidant gases (i.e., $H_2$ & $O_2$) over the faces of the MEAs 4 and 6.

Nonconductive gaskets 26, 28, 30, and 32 provide seals and electrical insulation between the several components of the fuel cell stack. Gas permeable carbon/graphite diffusion papers 34, 36, 38 and 40 press up against the electrode faces of the MEAs 4 and 6. The end plates 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6.

The bipolar plates may comprise graphite, graphite-filled polymer, or metal. Preferably, the bipolar plates will comprise two separate metal sheets/panels bonded together so as to provide a coolant flow passage therebetween. Bonding may, for example, be accomplished by brazing, diffusion bonding, or gluing with a conductive adhesive, as is well known in the art. The metal sheets are made as thin as possible (e.g., about 0.002–0.02 inches thick), and may be formed by stamping, by photo etching (i.e., through a photolithographic mask) or by any other conventional process for shaping sheet metal.

Figure 2:
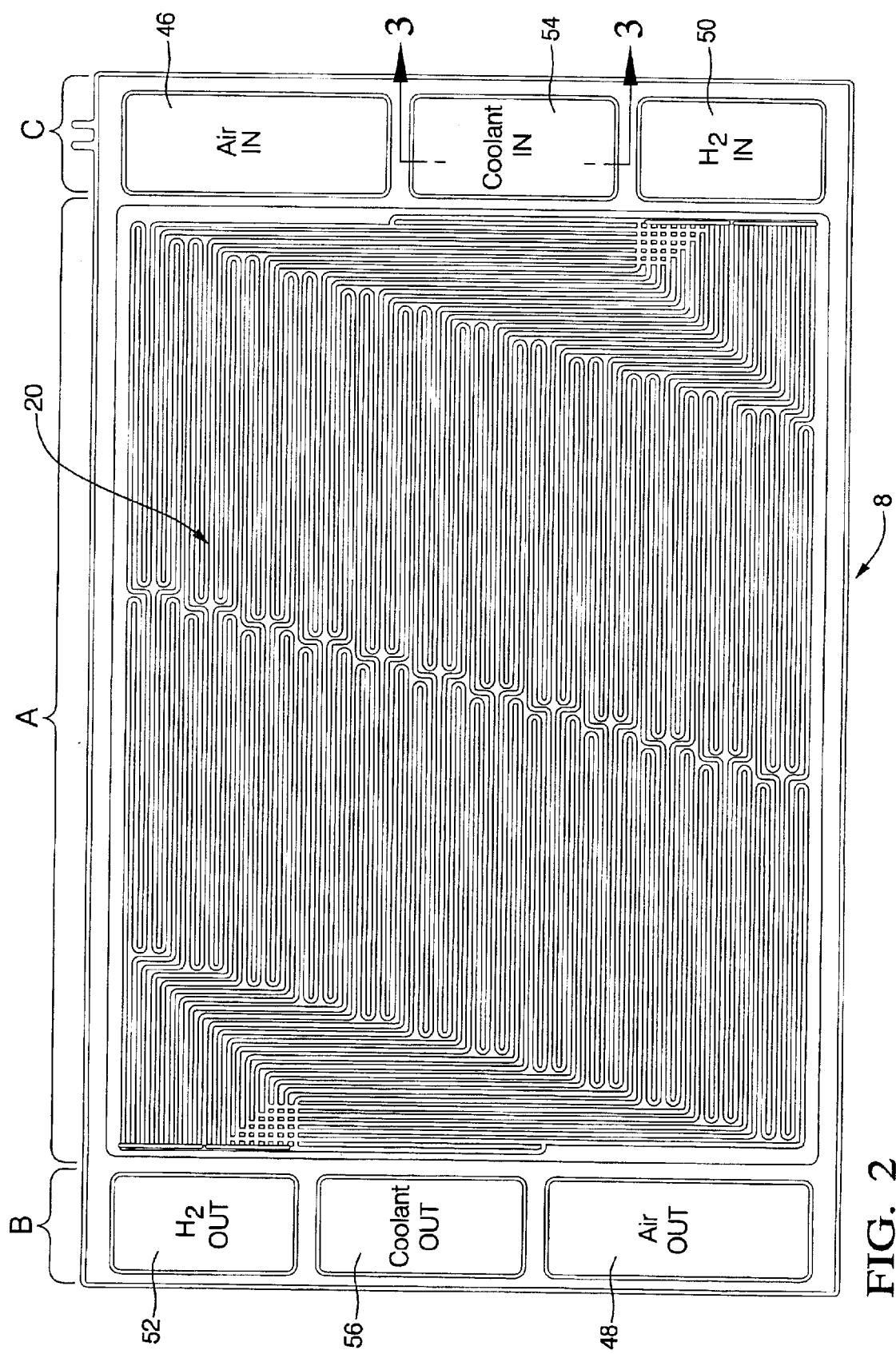
FIG. 2 is a plan view of the anode side of a bipolar plate.

FIG. 2 depicts the anode side of a bipolar plate 8 (e.g. from FIG. 1) having a central active region "A" that confronts the MEAs 36, 38, and is bordered by inactive regions "B" and "C". The active region A has a first working face having an anode flow field 20 comprising a plurality of serpentine flow channels for distributing hydrogen over the face of the MEA 4 that it confronts. The particular flow field 20 depicted is described in more detail in U.S. Pat. No. 6,309,773 to Rock issued Oct. 30, 2001, which is assigned to the assignee of the present invention and is hereby incorporated herein by reference. A similar working face 22 on the opposite (i.e. cathode) side (not shown) of the plate serves to distribute air over the face of the MEA 6 that it confronts. The active regions of bipolar plates that are made from corrosion sensitive metals will preferably be coated with a conductive, corrosion-resistant coating such as described in copending U.S. patent application Ser. No. 09/456,478, Fronk et al. filed Dec. 7, 1999, which is assigned to the assignee of the present invention, and is hereby incorporated herein by reference. Fronk et al. discloses metal bipolar plates having a protective coating comprising a plurality of electrically-conductive, corrosion-proof filler particles dispersed throughout a matrix of an acid-resistant, water-insoluble, oxidation resistant polymer that binds the particles together and to the faces of the bipolar plates.

The active region A of the bipolar plate 8 is flanked by two inactive border portions B and C which contain openings 46, 48, 50, 52, 54 and 56 therethrough. When the plates are stacked together, the openings in one bipolar plate are aligned with like openings in the other bipolar plates. Other components of the stack such as gaskets 26, 28, 30 and 32, as well as the membrane of the MEAs 4 and 6 and the end plates 14, 16 have corresponding openings (see FIG. 1) that align with the openings in the bipolar plates in the stack, and together form manifolds for supplying and removing gaseous reactants and liquid coolant to/from the stack. In the embodiment shown in FIGS. 1 & 2: (1) openings 46 in a series of stacked plates form an air inlet manifold; (2) openings 48 in a series of stacked plates form an air outlet manifold; (3) openings 50 in a series of stacked plates form a hydrogen inlet manifold; (4) openings 52 in a series of stacked plates form a hydrogen outlet manifold; (5) openings 54 in a series of stacked plates form a coolant inlet manifold; and (6) openings 56 in a series of stacked plates form a coolant outlet manifold. Referring to FIG. 1, oxygen/air is supplied to the air inlet manifold of the stack via appropriate supply plumbing 58, while hydrogen is supplied to the hydrogen manifold via supply plumbing 60. Exhaust plumbing for both the $H_2$ (62) and $O_2$/air (64) are also be provided for the H2 and air exhaust manifolds. Additional plumbing 66, 68 is provided for respectively supplying liquid coolant to, and removing coolant from, the coolant inlet and outlet manifolds.

Figure 3:
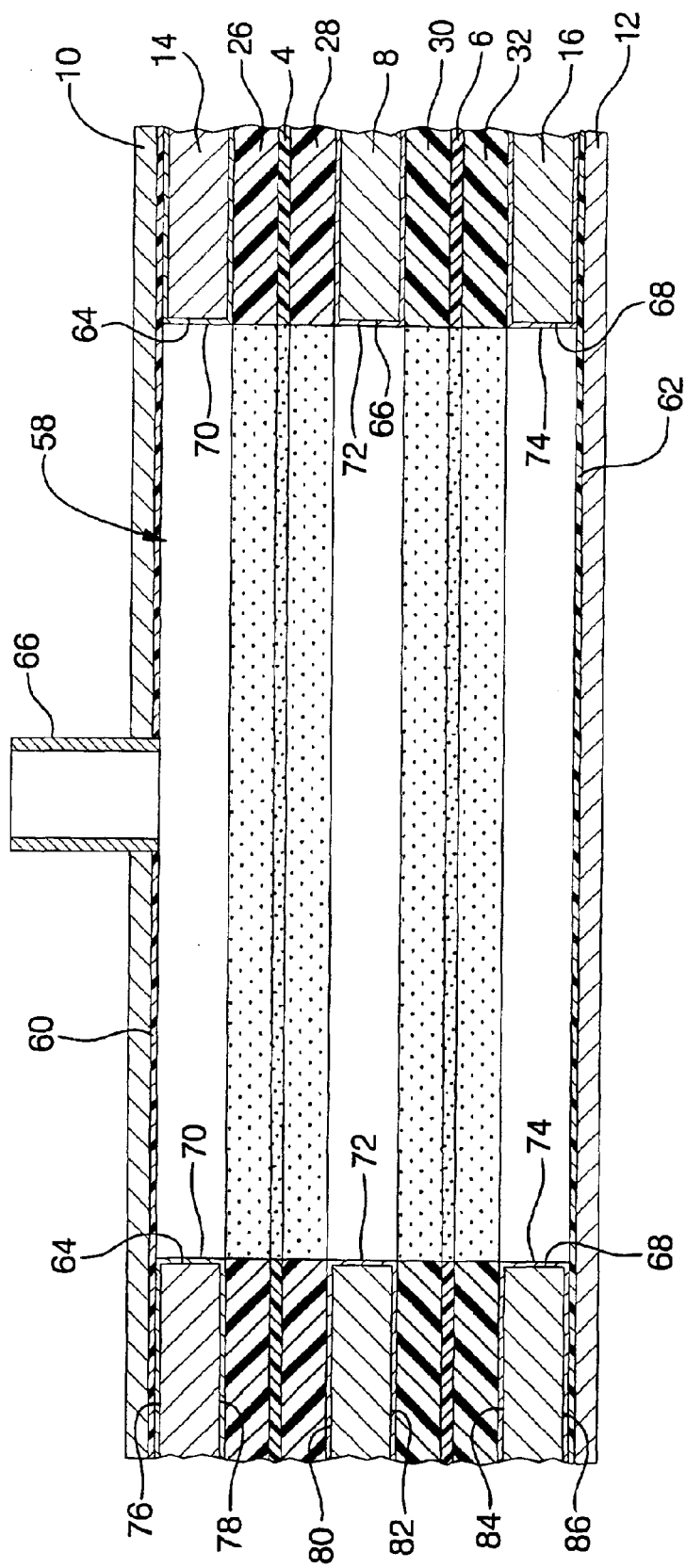
FIG. 3 is section in the direction 3—3 of FIG. 2.

FIG. 3 is a section through the coolant inlet manifold of FIG. 1 taken in the direction 3—3 of FIG. 2. FIG. 3 shows a coolant manifold 58 formed by aligning the openings in the several components of the fuel cell of FIG. 1. The clamping plates 10 and 12 are electrically insulated from the end plates 14, 16 by means of thin dielectric coatings 60 and 62 respectively. In accordance with the present invention, the inside surfaces 64, 66 and 68 of the openings in the bipolar and monoplar plates 8, 14 & 16 are respectively coated with a non-conductive coating 70, 72 and 74 thereby electrically insulating the coolant from the bipolar/monopolar plates. Preferably, the entire inactive region of the bipolar electrode will be coated with the non-conductive coating. Hence, such surfaces as 76, 78, 80, 82, 84 and 86, that do not confront the manifold 58, are also coated (1) to provide additional protection against shunt currents resulting from the coolant invading the interface between a bipolar plate 8 and a contiguous gasket 28 or 30, and (2) to simplify the coating process.

The non-conductive coatings may have different compositions and be applied in a variety of different ways. Hence, polymer coatings may be either thermosetting or thermoplastic and preferably selected from the group consisting of epoxies, polyamide-imides, polyether imides, polyphenols, fluro-elastomers, polyesters, phenoxy-phenolics, epoxide-phenolics, acrylics and urethanes. The polymer coating may be applied by dissolving the polymer in a suitable solvent, dipping the inactive region of the plate in a pool of the dissolved polymer, removing the plate from the pool and driving off the solvent. Alternatively, the dissolved polymer may be sprayed or brushed onto surface of the inactive region. Moreover, the inactive region could be dipped in a melt of the polymer to form a molten film on the surface of the inactive region, and thereafter allowing the film to cool and solidify. Still further, suitable polymers could be electrophoretically deposited on to the surface of the inactive area. Electrophoretcally deposited polymer coatings are particularly advantageous because they can be quickly deposited in an automated process with little waste, and can be deposited substantially uniformly onto surfaces having complex and recessed surfaces. In the electrophoretic deposition process a conductive substrate is immersed in an aqueous suspension of a charged acid-soluble polymer, and under the influence of an applied current, the polymer migrates to, and precipitates on, the substrate which has an opposing charge. When cross-linkable polymers are used, the suspension also includes a catalyst for promoting the cross-linking. Electrophoretic deposition is well known and is discussed in a variety of publications including "Cathodic Electrodeposition", Journal of Coatings Technology, Volume 54, No. 688, pp 35–44 (May 1982).

When the bipolar plate comprises a readily oxidizeable metal, the non-conductive coating will preferably comprise an oxide of that metal that is anodically grown on the surface of the metal. Hence, according to a preferred embodiment of the invention, the bipolar plate comprises essentially titanium whose inactive region has been anodized to produce an insulating titanium oxide skin thereon. In this regard, the inactive region of the bipolar plate is immersed in a suitable electrolyte and anodically polarized therein against a counterelectrode. We have found that commercially available ethylene-glycol-based coolants such as Dexcool™ Extra Life Antifreeze Coolant (from Havoline), or Electra-cool™ (from General Motors Vehicle Care) that contain organic salt rust inhibitors (e.g. the potassium salt of 2-ethyl hexanoic acid) make suitable electrolytes. The inactive region is positioned in the electrolyte opposite a counterelectrode comprising platinized titanium with an anode-to-cathode gap of about 12 mm. A voltage of 14 V is applied between the plate and the counterelectrode or for about 3 minutes until the evolution of gas at the plate subsides significantly. The plate is then removed from the electrolyte and rinsed with deionized water.

While the invention has been described in terms of certain specific embodiments thereof, it is not intended to be limited thereto, but rather only to the extent set forth hereafter in the claims which follow.

What is claimed is:

1. In a PEM fuel cell comprising a plurality of cells arranged in a stack, each cell comprising an anode exposed to a first reactant, a cathode exposed to a second reactant and a membrane-electrolyte interjacent said anode and cathode, at least one electrically conductive, bipolar plate separating one of said cells from the next, said bipolar plate comprising (a) an electrically conductive, active region having a first face confronting the anode of one cell in said stack, a second face confronting the cathode of the next adjacent cell in said stack, and an internal cooling passage for circulating coolant through said plate behind said faces, and (b) an electrically conductive inactive region bordering said active region, said inactive region having a surface defining an opening in said inactive region that in part defines a manifold adapted to supply coolant to said passage or remove coolant from said passage, the improvement comprising an adherent, non-conductive coating on said surface to reduce the flow of shunt currents through said coolant in said manifold.

2. A fuel cell according to claim 1 wherein said coating is selected from the group consisting of oxides and polymers.

3. A fuel cell according to claim 1 wherein said electrically conductive bipolar plate comprises a metal and said non-conductive coating comprises an oxide of said metal anodically grown in situ on said metal.

4. A fuel cell according to claim 3 wherein said metal is titanium and said inactive region comprises anodized titanium.

5. In a fuel cell comprising a plurality of cells arranged in a stack, each cell comprising an anode exposed to a first reactant, a cathode exposed to a second reactant and an electrolyte interjacent said anode and cathode, at least one electrically conductive, bipolar plate separating one of said cells from the next, said bipolar plate comprising (a) an electrically conductive, active region having a first face confronting the anode of one cell in said stack, a second face confronting the cathode of the next adjacent cell in said stack, and an internal cooling passage for circulating coolant through said plate behind said faces, and (b) an electrically conductive inactive region bordering said active region, said inactive region having a surface defining an opening in said inactive region that in part defines a manifold adapted to supply coolant to said passage or remove coolant from said passage, the improvement comprising an adherent, non-conductive coating on said surface to reduce the flow of shunt currents through said coolant in said manifold.

* * * * *